United States Patent
Ohkubo et al.

(10) Patent No.: US 8,496,301 B2
(45) Date of Patent: Jul. 30, 2013

(54) VEHICLE BRAKE MECHANISM AND METHOD FOR CONTROLLING THE VEHICLE BRAKE MECHANISM

(75) Inventors: Naoto Ohkubo, Wako (JP); Arata Inoue, Wako (JP); Takashi Nishioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 13/079,815

(22) Filed: Apr. 5, 2011

(65) Prior Publication Data

US 2011/0241419 A1    Oct. 6, 2011

(30) Foreign Application Priority Data

Apr. 5, 2010  (JP) .................................. 2010-86731

(51) Int. Cl.
    *B60T 8/44*    (2006.01)
(52) U.S. Cl.
    USPC .................. 303/114.1; 303/113.4; 303/115.4; 303/116.1
(58) Field of Classification Search
    USPC ............ 303/10, 11, 114.1, 15, 122.11, 113.3, 303/113.4, 115, 116.1, 116.2
    See application file for complete search history.

(56) References Cited

U.S. PATENT DOCUMENTS

| 7,651,176 B2 * | 1/2010 | Inoue et al. ................ 303/114.1 |
| 2004/0004392 A1 | 1/2004 | Kusano |
| 2007/0176486 A1 | 8/2007 | Nakamura |
| 2009/0179483 A1 | 7/2009 | Hatano |

FOREIGN PATENT DOCUMENTS

| CN | 101011963 | 8/2007 |
| JP | 2008230362 A * | 10/2008 |
| JP | 2009-161130 | 7/2009 |

OTHER PUBLICATIONS

Chinese Office Action for corresponding CN Application No. 201110083216.5, Mar. 25, 2013.

* cited by examiner

*Primary Examiner* — Melanie Torres Williams
(74) *Attorney, Agent, or Firm* — Ditthavong Mori & Steiner, P.C.

(57) ABSTRACT

A vehicle brake mechanism includes a master cylinder operated with a brake pedal. A first fluid channel connects a first hydraulic chamber of the master cylinder to a first-circuit wheel cylinder. A second fluid channel connects a second hydraulic chamber of the master cylinder to a second-circuit wheel cylinder. A master cut valve is provided in the first fluid channel and is capable of hindering communication between the first hydraulic chamber and the first-circuit wheel cylinder. A slave cylinder is connected to the second fluid channel and is driven by an actuator to generate a hydraulic pressure. A third fluid channel is provided downstream of the master cut valve and the slave cylinder and connects the first fluid channel and the second fluid channel to each other. A connection control valve is provided in the third fluid channel to close the third fluid channel.

10 Claims, 7 Drawing Sheets

US 8,496,301 B2

VEHICLE BRAKE MECHANISM AND METHOD FOR CONTROLLING THE VEHICLE BRAKE MECHANISM

CROSS-REFERENCE TO RELATED APPLICATIONS

The present application claims priority under 35 U.S.C. §119 to Japanese Patent Application No. 2010-86731, filed Apr. 5, 2010, entitled "Vehicle Brake Mechanism and Method for Controlling Vehicle Brake Mechanism." The contents of this application are incorporated herein by reference in their entirety.

BACKGROUND OF THE INVENTION

1. Field of the Invention

The present invention relates to a vehicle brake mechanism and a method for controlling the vehicle brake mechanism.

2. Description of the Related Art

Japanese Unexamined Patent Application Publication No. 2009-161130 describes a brake-by-wire (BBW) vehicle brake system having the following structure. The brake mechanism includes a tandem master cylinder, a tandem slave cylinder, first-circuit wheel cylinders, and second-circuit wheel cylinders. A first hydraulic chamber of the master cylinder is connected to the first-circuit wheel cylinders through a first hydraulic chamber of the slave cylinder. A second hydraulic chamber of the master cylinder is connected to the second-circuit wheel cylinders through a second hydraulic chamber of the slave cylinder. When the system is operating normally, the first-circuit wheel cylinders and the second-circuit wheel cylinders are operated by hydraulic pressures generated by the slave cylinder. When the system is not operating normally, the first-circuit and second-circuit wheel cylinders are operated by hydraulic pressures generated by the master cylinder.

SUMMARY OF THE INVENTION

According to one aspect of the invention, a vehicle brake mechanism includes a master cylinder, a stroke simulator, a first fluid channel, a second fluid channel, a master cut valve, a slave cylinder, a third fluid channel, and a connection control valve. The master cylinder is operated with a brake pedal and has a first hydraulic chamber and a second hydraulic chamber. The master cylinder is capable of generating hydraulic pressures for two circuits. The stroke simulator is provided between the brake pedal and the master cylinder and is elastically deformable by a treading force applied to the brake pedal. The first fluid channel connects the first hydraulic chamber of the master cylinder to a first-circuit wheel cylinder. The second fluid channel connects the second hydraulic chamber of the master cylinder to a second-circuit wheel cylinder. The master cut valve is provided in the first fluid channel and is capable of hindering communication between the first hydraulic chamber and the first-circuit wheel cylinder. The slave cylinder is connected to the second fluid channel and is driven by an actuator to generate a hydraulic pressure. The third fluid channel is provided downstream of the master cut valve and the slave cylinder and connects the first fluid channel and the second fluid channel to each other. The connection control valve is provided in the third fluid channel to close the third fluid channel.

According to another aspect of the invention, a method for controlling the above-mentioned vehicle brake mechanism includes transmitting a hydraulic pressure generated in the first hydraulic chamber of the master cylinder to the first-circuit wheel cylinder in a state in which the connection control valve closes the third fluid channel and the master cut valve allows the communication between the first hydraulic chamber and the first-circuit wheel cylinder. The hydraulic pressure generated in the slave cylinder is transmitted to the second-circuit wheel cylinder in the state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
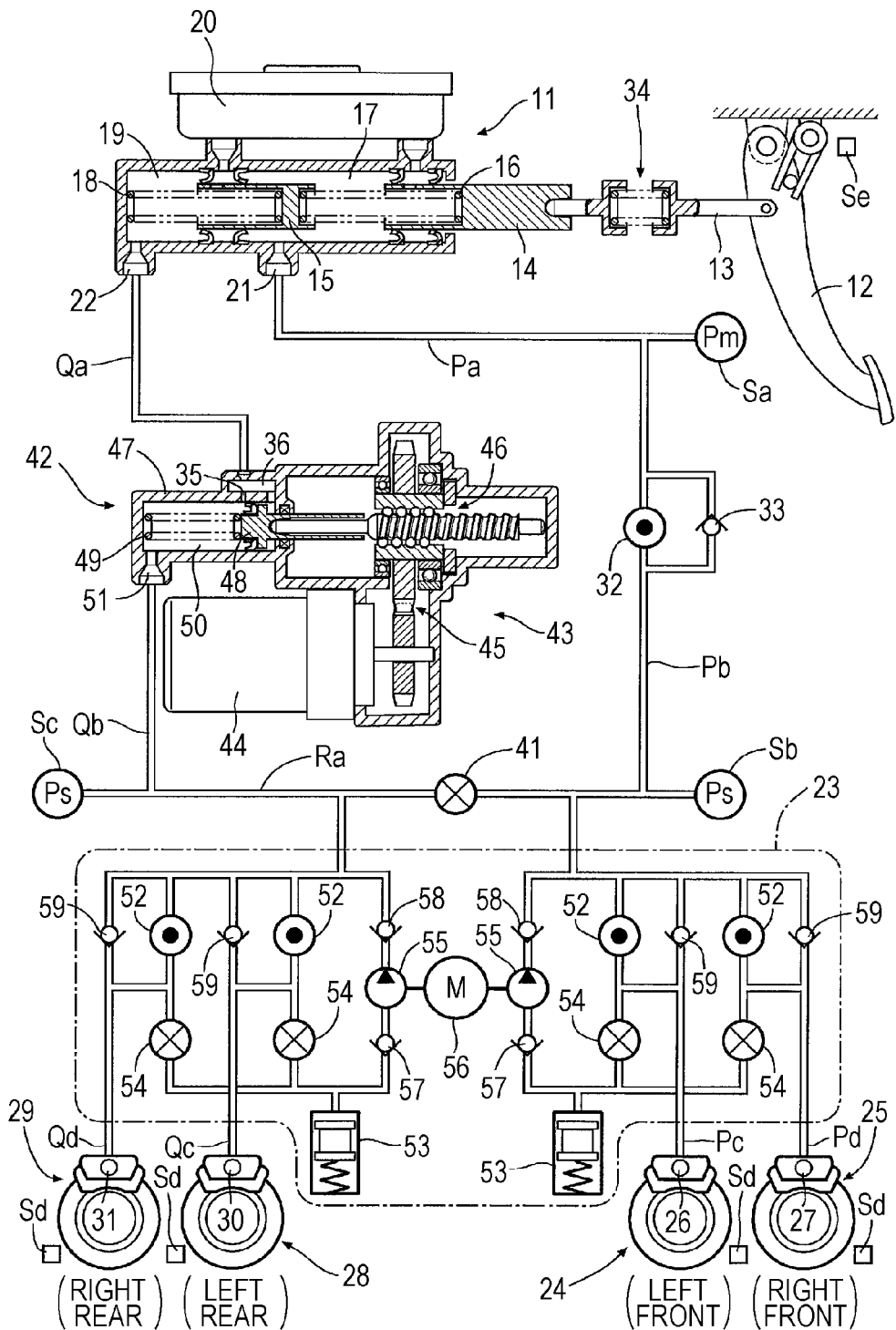
FIG. 1 illustrates a hydraulic circuit of a vehicle brake mechanism according to an embodiment of the present invention (when electric power is OFF)

Hereinafter, the embodiments of the present invention will be described with reference to FIGS. 1 to 7, wherein like reference numerals designate corresponding or identical elements throughout the various drawings.

As illustrated in FIG. 1, a tandem master cylinder 11 includes a first piston 14 and a second piston 15. The first piston 14 is connected through a push rod 13 to a brake pedal 12 that is operated by a driver. The second piston 15 is disposed in front of the first piston 14. A first hydraulic chamber 17 is formed between the first piston 14 and the second piston 15, and a return spring 16 is disposed in the first hydraulic chamber 17. A second hydraulic chamber 19 is formed in front of the second piston 15, and a return spring 18 is disposed in the second hydraulic chamber 19. A stroke simulator 34, which includes a spring, is disposed in a middle portion of the push rod 13.

The first hydraulic chamber 17 and the second hydraulic chamber 19 are connectable to a reservoir 20, and respectively have a first outlet port 21 and a second outlet port 22. The first outlet port 21 is connected through a fluid channel Pa, a master cut valve 32 that is a normally open solenoid valve, a fluid channel Pb, a hydraulic modulator 23, and fluid channels Pc and Pd to, for example, first-circuit wheel cylinders 26 and 27 of disk brake mechanisms 24 and 25 for left and right front wheels. The second outlet port 22 is connected through a fluid channel Qa, a slave cylinder 42, a fluid channel Qb, the hydraulic modulator 23, and fluid channels Qc and Qd to, for example, second-circuit wheel cylinders 30 and 31 of disk brake mechanisms 28 and 29 for the left and right front wheels. A check valve 33 is parallelly connected to the master cut valve 32. The check valve 33 allows brake fluid to flow only in a direction from the fluid channel Pa to the fluid channel Pb.

A third fluid channel Ra connects the fluid channel Pb, which is disposed downstream of the master cut valve 32, and the fluid channel Qb, which is disposed downstream of the slave cylinder 42, to each other. A connection control valve 41, which is a normally closed solenoid valve, is disposed in the third fluid channel Ra.

In this specification, regarding the first fluid channels Pa to Pd and the second fluid channels Qa to Qd, "upstream" refers to a direction toward the master cylinder 11 and "downstream" refers to a direction toward the wheel cylinders 26, 27, 30, and 31.

An actuator 43 moves the slave cylinder 42 by transmitting the rotation of an electric motor 44 through a gear train 45 to a ball screw mechanism 46. A piston 48 is slidably inserted into a cylinder body 47 of the slave cylinder 42 and is urged backward by a return spring 49. The ball screw mechanism 46 of the actuator 43 drives the piston 48 forward against the urging force of the return spring 49. A hydraulic chamber 50 of the slave cylinder 42 is connected to the fluid channel Qb through an outlet port 51. Moreover, the hydraulic chamber 50 is connected to the fluid channel Qa through an inlet port 35 and a back chamber 36. When the piston 48 moves forward, brake fluid flows from the fluid channel Qa into the back chamber 36, so that the volume of the back chamber 36 increases. Therefore, after the cup seal of the piston 48 has passed the inlet port 35, a hydraulic pressure is generated in the hydraulic chamber 50, and the hydraulic pressure is output through the outlet port 51 to the fluid channel Qb. Thus, the second piston 15 of the master cylinder 11 is allowed to move forward.

The structure of the hydraulic modulator 23 having an anti-lock brake (ABS) function and a vehicle stability assist (VSA) function is known. The hydraulic modulator 23 has the same structure in the first-circuit portion thereof, which is connected to the disk brake mechanisms 24 and 25 for the left and right front wheels, and in the second-circuit portion thereof, which is connected to the disk brake mechanisms 28 and 29 for the left and right rear wheels. For example, in the first-circuit portion, which is connected to the disk brake mechanisms 24 and 25 for the front wheels, a pair of inner valves 52, which are normally open solenoid valves, are disposed between the fluid channel Pb and the fluid channels Pc and Pd. On the downstream side of the inner valves 52, a pair of outer valves 54, which are normally closed solenoid valves, are disposed between the fluid channels Pc and Pd and a reservoir 53. A hydraulic pump 55 is disposed between the reservoir 53 and the fluid channel Pb, and the hydraulic pump 55 is driven by an electric motor 56.

Check valves 57 and 58, which allow brake fluid to flow only in a direction from the reservoir 53 to the fluid channels Pb and Qb, are disposed on the inlet side and the outlet side of the hydraulic pump 55, respectively. A check valve 59 is parallelly connected to each of the inner valves 52. The check valves 59 allow brake fluid to flow only in a direction from the fluid channels Pc, Pd, Qc, and Qd to the fluid channels Pb and Qb.

A first hydraulic sensor Sa for detecting the fluid pressure in the fluid channel Pa is connected to the fluid channel Pa. A second hydraulic sensor Sb for detecting the fluid pressure in the fluid channel Pb is connected to the fluid channel Pb. A third hydraulic sensor Sc for detecting the fluid pressure in the fluid channel Qb is connected to the fluid channel Qb. An electronic control unit (not shown) is connected to the master cut valve 32, the connection control valve 41, the slave cylinder 42, and the hydraulic modulator 23. To the electronic control unit, the first hydraulic sensor Sa, the second hydraulic sensor Sb, the third hydraulic sensor Sc, a wheel speed sensor Sd for detecting the wheel speed of each wheel, and a stroke sensor Se for detecting the stroke of the brake pedal 12 are connected.

Next, the operation of the embodiment of the present invention, which has the above-described structure, will be described.

Figure 2:
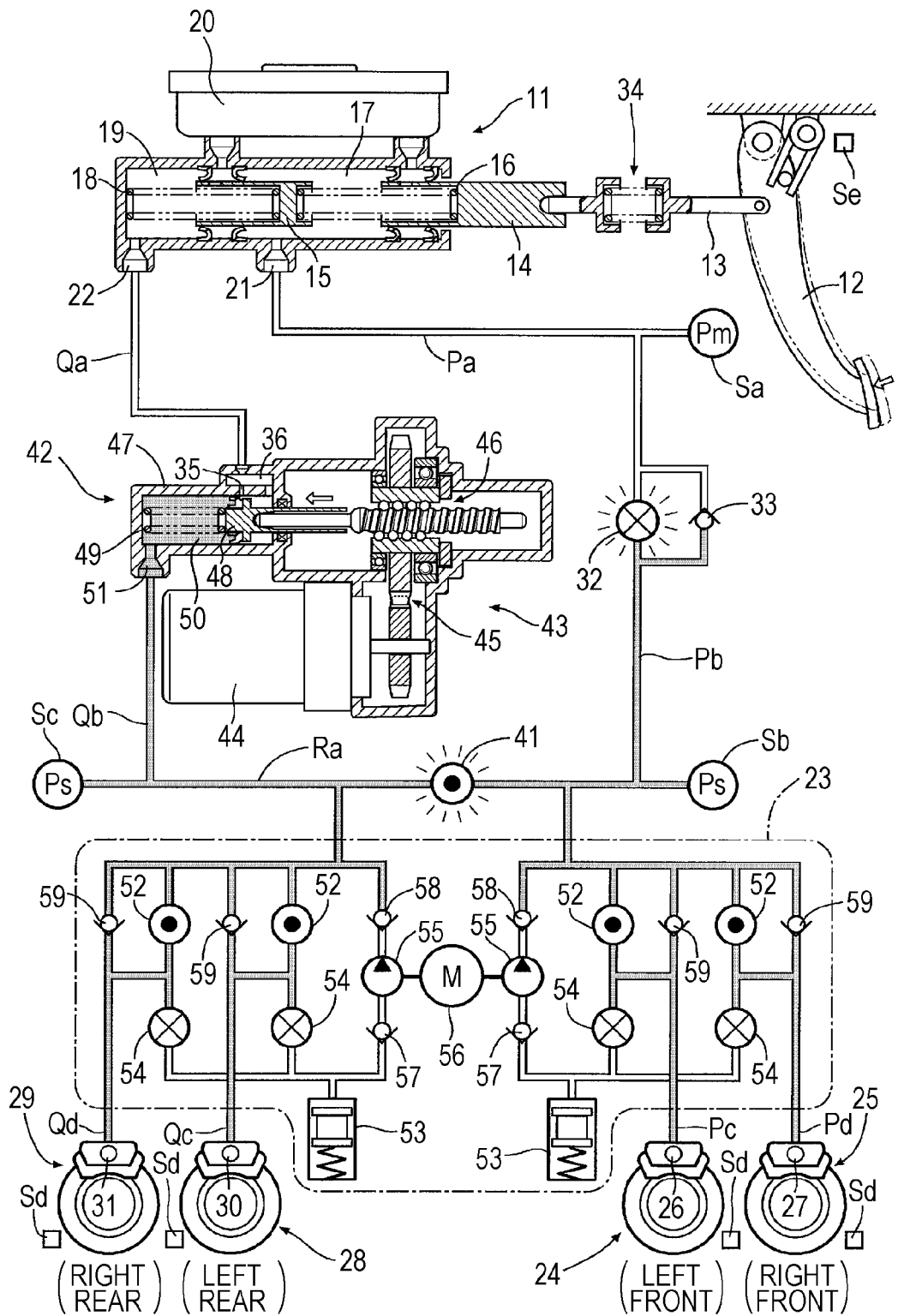
FIG. 2 illustrates an operation of the vehicle brake mechanism during ordinary braking (when the stroke of the brake pedal is short)

First, referring to FIG. 2, an ordinary braking operation that is performed in a normal state (when the stroke of the brake pedal 12 is short) will be described.

If a driver operates the brake pedal 12 through a short stroke when the system is operating normally, the spring of the stroke simulator 34 of the push rod 13, which has a spring constant smaller than those of the return springs 16 and 18 of the master cylinder 11, is compressed and allows a stroke of the brake pedal 12. However, a hydraulic pressure is not generated because the first and second pistons 14 and 15 of the master cylinder 11 are not moved.

When the stroke sensor Se detects depressing of the brake pedal 12 by the driver, the master cut valve 32, which is a normally open solenoid valve, is activated and closed, and the connection control valve 41, which is a normally closed solenoid valve, is activated and opened. At the same time, the actuator 43 of the slave cylinder 42 is activated and moves the piston 48 forward, whereby a hydraulic pressure is generated in the hydraulic chamber 50. At this time, because the connection control valve 41, which is a normally closed solenoid valve, is activated and open, the hydraulic pressure generated by the slave cylinder 42 is transmitted to the fluid channel Qb and to the fluid channel Pb that is connected to the fluid channel Qb through the third fluid channel Ra. The hydraulic pressure is further transmitted from the fluid channels Pb and Qb through the inner valves 52 of the hydraulic modulator 23, which are open, to the wheel cylinders 26, 27, 30 and 31 of the disk brake mechanisms 24, 25, 28, and 29, whereby the brakes are applied to the wheels.

The hydraulic pressure generated by the slave cylinder 42 is detected by the third hydraulic sensor Sc disposed in the fluid channel Qb (or by the second hydraulic sensor Sb disposed in the fluid channel Pb). The actuator 43 of the slave cylinder 42 is controlled so that the magnitude of the hydraulic pressure detected by the sensor Se matches the stroke of the brake pedal 12. Thus, the disk brake mechanisms 24, 25, 28, and 29 can generate braking forces in accordance with the amount of force with which the driver operates the brake pedal 12.

In the case where it is necessary to transiently make the hydraulic pressure transmitted to the first-circuit wheel cylinders 26 and 27 (for the front wheels) be different from the hydraulic pressure transmitted to the second-circuit wheel cylinders 30 and 31 (for the rear wheels), the braking force for the front wheels can be made smaller than that for the rear wheels by opening the connection control valve 41, which is a variable opening valve, to an intermediate opening degree.

In the case where the vehicle is a hybrid vehicle whose front wheels, for example, are driven by a motor/generator, when the vehicle decelerates, control is performed so that a hydraulic braking force for the front wheels, which are connected to the motor/generator, is reduced by the amount of a braking force due to regenerative braking performed by the motor/generator, so that the total braking force matches a target value. In such a case, the hydraulic braking force for the front wheels can be controlled to be transiently reduced by controlling the connection control valve 41 to be opened with a predetermined intermediate degree of opening as described above.

Figure 3:
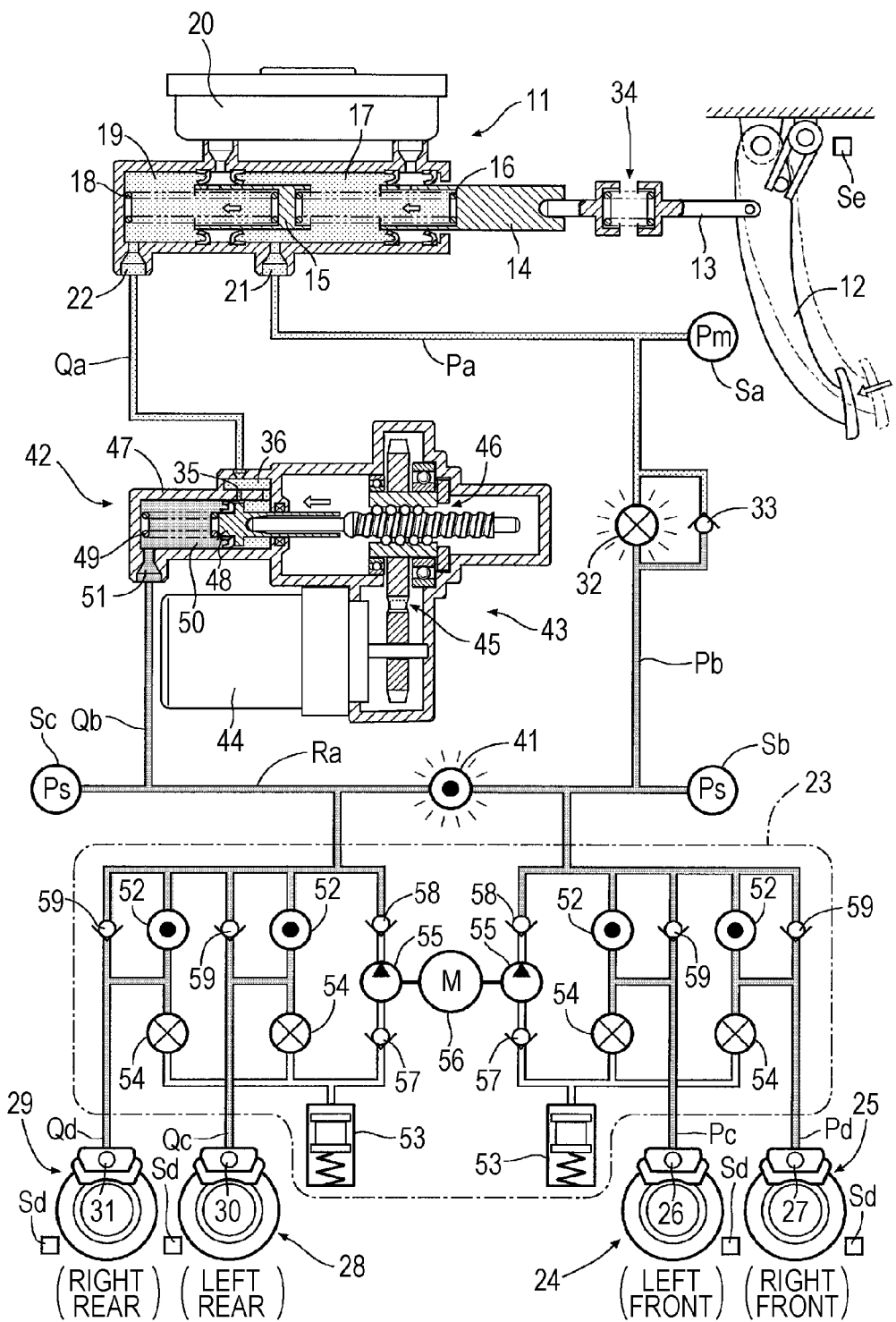
FIG. 3 illustrates an operation of the vehicle brake mechanism during ordinary braking (when the stroke of the brake pedal is medium or long)

Referring to FIG. 3, an ordinary braking operation that is performed in a normal state (when the stroke of the brake pedal 12 is medium or long) will be described.

When a driver operates the brake pedal 12 through a medium or long stroke, the spring of the stroke simulator 34 of the push rod 13 and the return springs 16 and 18 of the master cylinder 11 are compressed to allow the stroke of the brake pedal 12. Therefore, the volume of the second hydraulic chamber 19 is reduced to push the brake fluid out of the second hydraulic chamber 19, and the brake fluid flows through the back chamber 36 of the slave cylinder 42 into an expandable space behind the piston 48.

The braking operation due to the action of the slave cylinder 42 is substantially the same as the above-described operation that is performed when the brake pedal 12 is operated through a short stroke.

Figure 4:
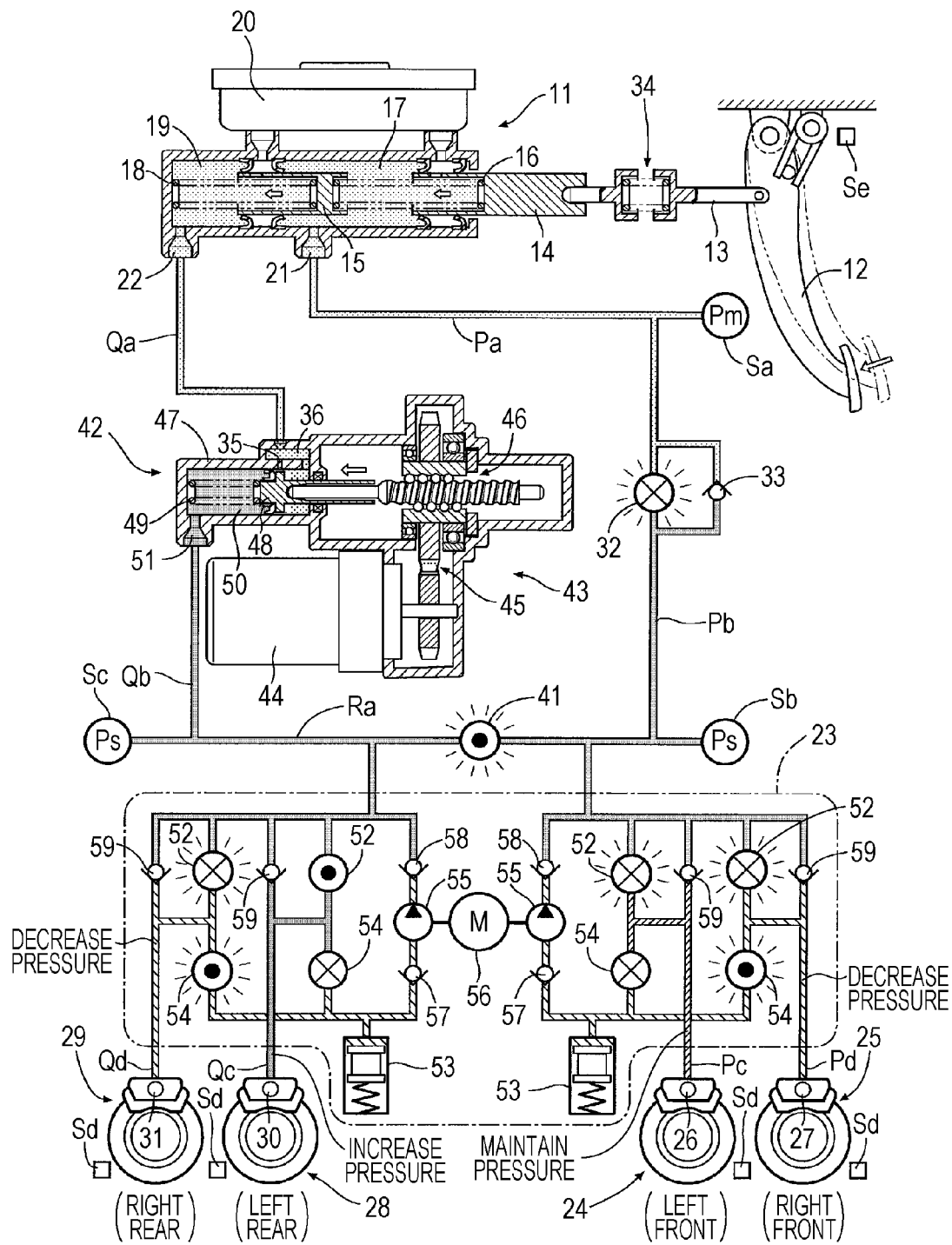
FIG. 4 illustrates an operation of the vehicle brake mechanism when ABS control is performed.

Referring to FIG. 4, ABS control that is performed in a normal state will be described.

When the brake pedal 12 is operated through a medium or long stroke in a normal state as described above, if it is detected that the slip ratio of a wheel has increased and the wheel is likely to be locked on the basis of the output of one of the speed sensors Sd, the hydraulic modulator 23 is activated while maintaining the slave cylinder 42 in an operating state to prevent the wheel from being locked.

That is, if a wheel is likely to be locked, the inner valve 52 of the wheel cylinder of the disk brake mechanism for the wheel is closed to block the transmission of the hydraulic pressure from the slave cylinder 42. In this state, a pressure-decreasing operation in which the outer valve 54 is opened to release the hydraulic pressure from the wheel cylinder to the reservoir 53 is performed, and then a pressure-maintaining operation in which the outer valve 54 is closed to maintain the hydraulic pressure in the wheel cylinder is performed, whereby the braking force is reduced to an appropriate level so that the wheel may not be locked.

After the wheel speed recovers and the slip ratio has been reduced as a result of the above-described operations, a pressure-increasing operation in which the inner valve 52 is opened to increase the hydraulic pressure of the wheel cylinder is performed, whereby the braking force for the wheel is increased. If the wheel becomes likely to be locked again due to the pressure-increasing operation, the pressure-decreasing operation, the pressure-maintaining operation, and the pressure-increasing operation are repeatedly performed, whereby the maximum braking force can be generated while preventing the wheel from being locked. The brake fluid that flows into the reservoir 53 during these operations is returned upstream by the hydraulic pump 55 to the fluid channels Pb and Qb.

When the slave cylinder 42 is activated and the cup seal of the piston 48 closes the inlet port 35, the hydraulic pressure that is generated in the second hydraulic chamber 19 of the master cylinder 11 is blocked, so that the hydraulic pressure is not transmitted to the hydraulic chamber 50 of the slave cylinder 42.

FIG. 4 illustrates a state in which the hydraulic pressure of the wheel cylinder 26 for the left front wheel is maintained, the hydraulic pressure of the wheel cylinder 27 for the right front wheel is reduced, the hydraulic pressure of the wheel cylinder 30 for the left rear wheel is increased, and the hydraulic pressure of the wheel cylinder 31 for the right rear wheel is reduced.

Figure 5:
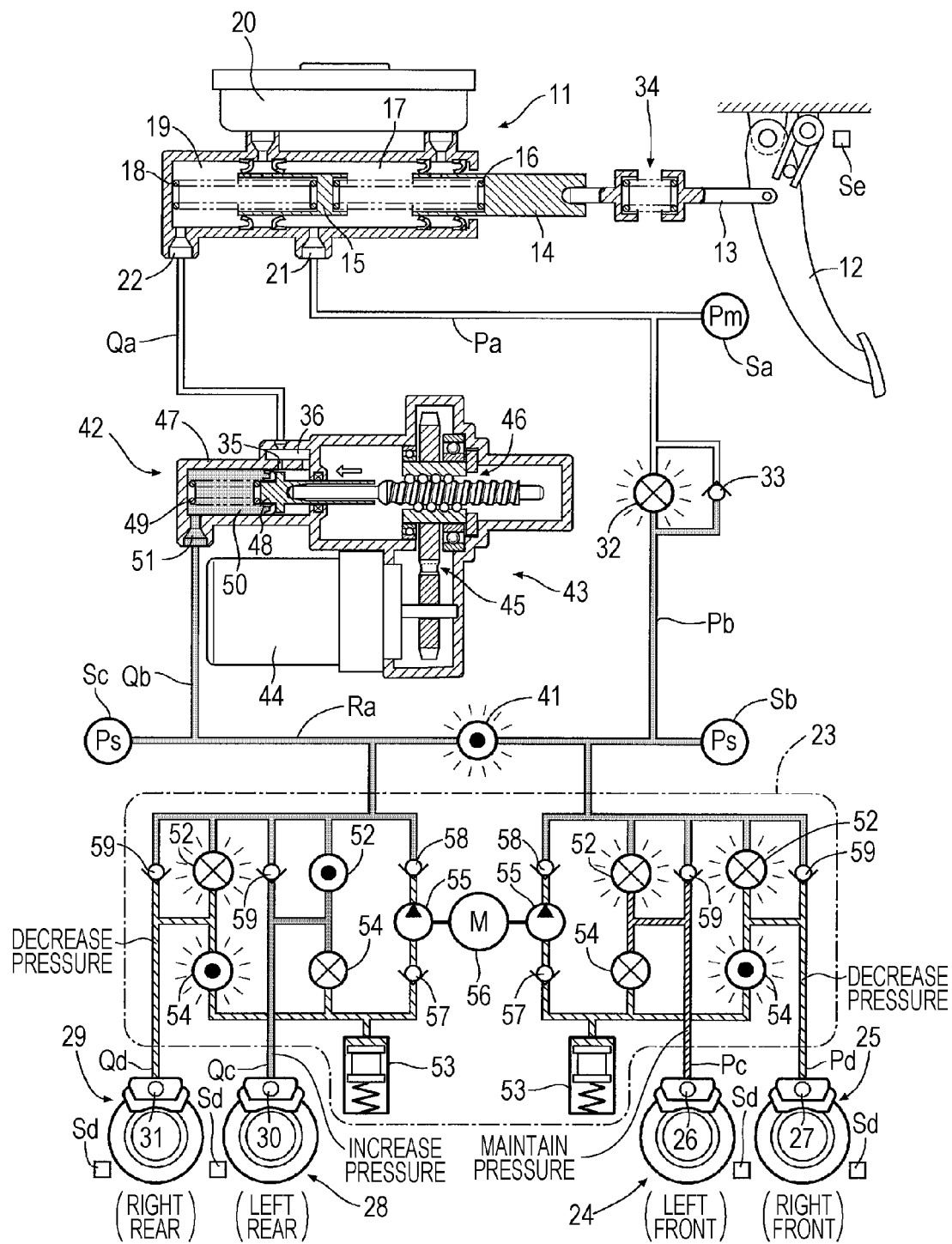
FIG. 5 illustrates an operation of the vehicle brake mechanism when VSA control is performed.

Referring to FIG. 5, an operation of VSA control in a normal state will be described.

The term "VSA control" refers to control for preventing a vehicle from skidding and thereby stabilizing the vehicle by using a yaw moment that is generated by differentiating the braking forces applied to the inner wheels and the outer wheels when the vehicle turns. In contrast to the above-described ABS control, which is performed only when braking a vehicle, the VSA control is performed when the vehicle turns irrespective whether the brake is used. As in the ABS control described above, the operations of increasing, maintaining, and reducing the hydraulic pressures transmitted to the wheel cylinders 26 and 27 and the wheel cylinders 30 and 31 are performed in the same manner. In contrast to ordinary ABS control, the hydraulic pressures can be adjusted by controlling the movement of the slave cylinder 42, so that the hydraulic pumps 55 need not have the pressure-increasing function and it is sufficient that the hydraulic pumps 55 only have a reflux function.

FIG. 5 illustrates a state in which the hydraulic pressure of the wheel cylinder 26 for the left front wheel is maintained, the hydraulic pressure of the wheel cylinder 27 for the right front wheel is reduced, the hydraulic pressure of the wheel cylinder 30 for the left rear wheel is increased, and the hydraulic pressure of the wheel cylinder 31 for the right rear wheel is reduced.

In the present embodiment, the VSA control is used as an example of a technology for independently increasing and decreasing the hydraulic pressures for the four wheels. However, such a technology for independently increasing and decreasing the hydraulic pressures for the four wheels is not limited to the VSA control.

Figure 6:
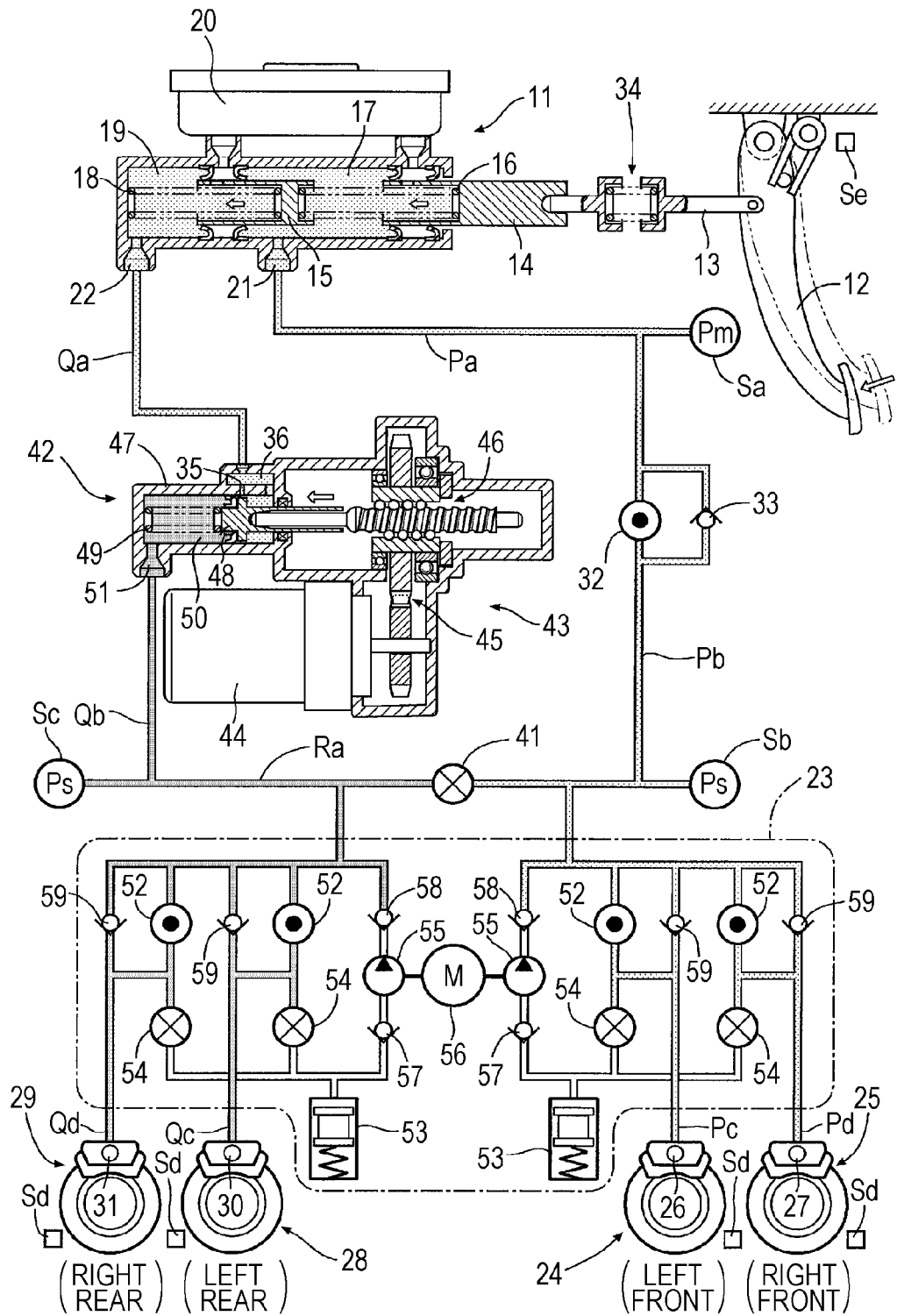
FIG. 6 illustrates an operation of the vehicle brake mechanism when a fault occurs in a fluid channel.

Referring to FIG. 6, an operation that is performed when a fault such as leakage occurs in the first-circuit wheel cylinders 26 and 27 or in the second-circuit wheel cylinders 30 and 31 will be described.

Suppose that, when the system is operation normally, a fault, such as leakage, occurs in one of the four wheel cylinders 26, 27, 30, and 31. In such a case, if the brake system is designed such that all of the first-circuit and second-circuit wheel cylinders 26, 27, 30, and 31 are operated by the slave cylinder 42 having only a single hydraulic chamber 50, the braking ability may be completely lost due to the leakage.

To prevent this, in the present embodiment, the master cut valve 32 is opened and the connection control valve 41 is closed to cut the connection between the first-circuit wheel cylinders 26 and 27 and the second-circuit wheel cylinders 30 and 31. Thus, hydraulic pressures are independently transmitted from the first hydraulic chamber 17 of the master cylinder 11 to the fluid channel Pb and from the slave cylinder 42 to the fluid channel Qb. Therefore, even if a fault occurs in one of the first-circuit wheel cylinders 26 and 27 and second-circuit wheel cylinders 30 and 31, the wheel cylinders of the other of the circuits can be operated normally to generate a braking force.

Figure 7:
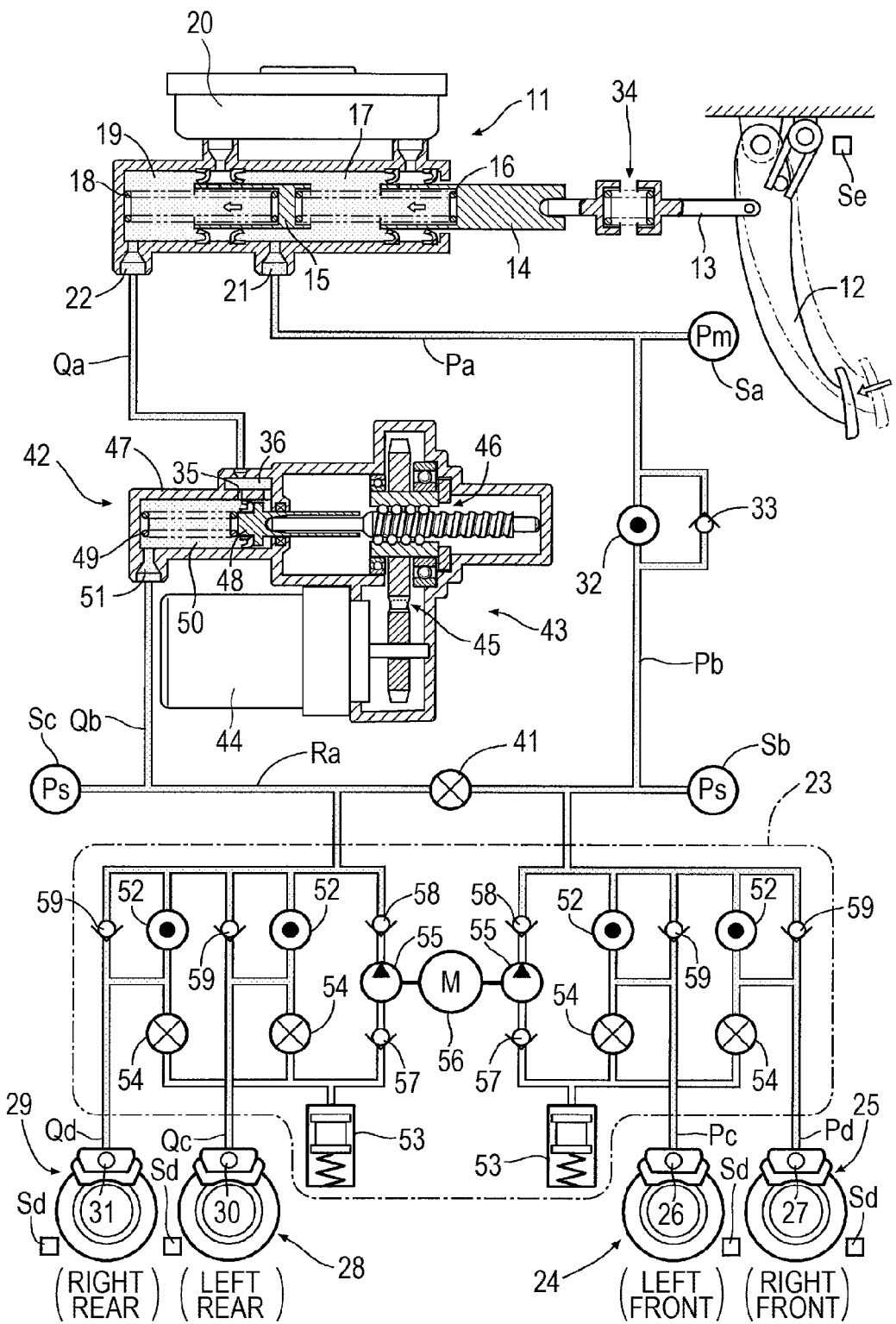
FIG. 7 illustrates an operation of the vehicle brake mechanism in the case of electric power failure.

Referring to FIG. 7, an operation that is performed when the slave cylinder 42 is disabled due to electric power failure or the like will be described.

In the case of electric power failure, the master cut valve 32, which is a normally open solenoid valve, is automatically opened, the connection control valve 41, which is a normally closed solenoid valve, is automatically closed, the inner valves 52, which are normally open solenoid valves, are automatically opened, and the outer valves 54, which are normally closed solenoid valves, are automatically closed. In this state, a hydraulic pressure that is generated in the first hydraulic chamber 17 of the master cylinder 11 is transmitted through the master cut valve 32 and the inner valves 52 and causes the wheel cylinders 26 and 27 of the disk brake mechanisms 24 and 25 for the front wheels to operate. A hydraulic pressure that is generated in the second hydraulic chamber 19 of the master cylinder 11 is transmitted through the slave cylinder 42 and the inner valves 52 and causes the wheel cylinders 30 and 31 of the disk brake mechanisms 28 and 29 for the rear wheels to operate. Thus, braking forces can be securely generated.

Moreover, in the case of electric power failure, the connection control valve 41 is closed and thereby the first-circuit fluid channels Pa to Pd and the second-circuit fluid channels Qa to Qd are completely disconnected from each other. Therefore, even if a fluid channel of one of the circuits fails, the braking force of the other of the circuits can be maintained.

Next, the operations of the first hydraulic sensor Sa disposed in the fluid channel Pa, the second hydraulic sensor Sb disposed in the fluid channel Pb, and the third hydraulic sensor Sc disposed in the fluid channel Qb will be described.

When the slave cylinder 42 is activated in a state in which the master cut valve 32 and the connection control valve 41 are commanded to open, if the output of the second hydraulic sensor Sb changes and the output of the first hydraulic sensor Sa does not change, it is determined that the master cut valve 32 has been stuck in a closed state.

Likewise, when the slave cylinder 42 is activated in a state in which the master cut valve 32 and the connection control valve 41 are commanded to open, if the stroke sensor Se detects a change in the stroke of the brake pedal 12 and the output of the first hydraulic sensor Sa changes and the output of the second hydraulic sensor Sb does not change, it is determined that the master cut valve 32 has been stuck in a closed state.

When the slave cylinder 42 is activated in a state in which the master cut valve 32 is commanded to open and the connection control valve 41 is commanded to be closed, if the output of at least one of the first hydraulic sensor Sa and the second hydraulic sensor Sb changes, it is determined that the connection control valve 41 has been stuck in an open state.

When the slave cylinder 42 is activated in a state in which the master cut valve 32 is commanded to be closed and the connection control valve 41 is commanded to open, if the output of the first hydraulic sensor Sa changes, it is determined that the master cut valve 32 has been stuck in an open state.

When the slave cylinder 42 is activated in a state in which the first hydraulic sensor Sa and the master cut valve 32 are operating normally and the master cut valve 32 and the connection control valve 41 are commanded to open, if the outputs of both of the first hydraulic sensor Sa and the second hydraulic sensor Sb do not change, it is determined that the connection control valve 41 has been stuck in a closed state.

If the slave cylinder 42 is commanded to be activated and the output of the third hydraulic sensor Sc does not change, it is determined that the slave cylinder 42 is not operating normally.

As described above, according to the present embodiment, the stroke simulator 34 allows a stroke of the brake pedal 12 when the master cut valve 32 is closed. Moreover, both the first and second fluid channels Pb and Qb, which are connected to each other through the third fluid channel Ra and the connection control valve 41 that is open, are connected to the slave cylinder 42. Thus, the first-circuit and second-circuit wheel cylinders 26, 27, 30, and 31 can be operated by a hydraulic pressure generated by the slave cylinder 42. Therefore, a tandem slave cylinder is not necessary, so that the structure of the brake mechanism can be simplified.

Moreover, if the slave cylinder 42 becomes disabled, by opening the master cut valve 32 and closing the connection control valve 41, the first-circuit wheel cylinders 26 and 27 and the second-circuit wheel cylinders 30 and 31 can be operated by hydraulic pressures generated in the first and second hydraulic chambers 17 and 19 of the master cylinder 11 through the first and second fluid channels Pa to Pd and Qa to Qd, respectively. At this time, the connection control valve 41 disposed in the third fluid channel Ra is closed and the connection between the first and second fluid channels Pb and Qb is cut. Therefore, even if a fault such as leakage occurs in a wheel cylinder of one of the first and second circuits, the wheel cylinders of the other of the circuits can operated to maintain a braking force.

In general, a hydraulic stroke simulator that absorbs brake fluid fed from the master cylinder to allow a stroke of a brake pedal has a complex structure. Moreover, it is necessary that a treading-force cut-off valve be disposed between the master cylinder and the stroke simulator, so that the number of components is increased. However, the stroke simulator 34 according to the present embodiment uses a coil spring, so that the stroke simulator 34 has a simple structure and the number of components can be reduced.

The above-described embodiment of the present invention can be modified in various ways within the spirit and the scope of the present invention.

For example, although the brake mechanism according to the embodiment includes the hydraulic modulator 23, the embodiment of the present invention can be applied to a brake mechanism that does not include the hydraulic modulator 23.

In the embodiment, the first-circuit wheel cylinders 26 and 27 are for the left and right front wheels, and the second-circuit wheel cylinders 30 and 31 are for the left and right rear wheels. Alternatively, the wheel cylinder 26 for the left front wheel and the wheel cylinder 31 for the right rear wheel may be connected to the first circuit, and the wheel cylinder 27 for the right front wheel and the wheel cylinder 30 for the left rear wheel may be connected to the second circuit. As a further alternative, the wheel cylinders 30 and 31 for the left and right rear wheels may be connected to the first circuit, and the wheel cylinders 26 and 27 for the left and right front wheels may be connected to the second circuit.

According to the embodiment of the present invention, in a normal state, the stroke simulator allows a stroke of the brake pedal when the master cut valve is closed. At the same time, the connection control valve is opened and the first and second fluid channels, which are connected to each other through the third fluid channel, are both connected to the slave cylinder, and the first-circuit and second-circuit wheel cylinder can be operated by the hydraulic pressures generated by the slave cylinder. Therefore, a tandem slave cylinder is not necessary and the structure of the brake mechanism can be simplified. In the case of electric power failure, the master cut valve is opened and the connection control valve is closed, whereby the first-circuit and second-circuit wheel cylinders can be operated by hydraulic pressures generated in the first and second hydraulic chambers of the master cylinder and transmitted through the first and second fluid channels. At this time, the connection control valve disposed in the third fluid channel is closed and the connection between the first and second fluid channels are cut, so that even if a fault such as leakage occurs in the wheel cylinder of one of the first and second circuits, the wheel cylinder of the other of the circuits can be operated to maintain a braking force.

According to the embodiment of the present invention, hydraulic pressures generated by the slave cylinder can be independently decreased and then transmitted to each of the wheel cylinders, so that a hydraulic pressure applied to each of the slave cylinders can be independently controlled to perform an ABS function or a VSA function.

According to the embodiment of the present invention, whether or not the master cut valve, the connection control valve, and the slave cylinder are operating normally can be determined by comparing the outputs of the first to third hydraulic sensors with each other.

According to the embodiment of the present invention, when the slave cylinder is operating, transmission of a hydraulic pressure from the slave cylinder to the master cylinder can be blocked without additionally providing a control valve or a check valve for cutting the connection between the second hydraulic chamber of the master cylinder and the second-circuit wheel cylinder. Moreover, if the hydraulic pressure in the slave cylinder is lower than the hydraulic pressure in the second hydraulic chamber of the master cylinder, brake fluid passes over the cup seal of the slave cylinder, whereby the second hydraulic chamber of the master cylinder is connected to the second-circuit wheel cylinder and backup is performed without fail.

According to the embodiment of the present invention, different hydraulic pressures can be transmitted to the wheel cylinders, so that braking forces for the wheels can be independently controlled.

According to the embodiment of the present invention, if a fault such as leakage occurs in the wheel cylinder of one of the first and second circuits, a braking force can be generated in the wheel cylinder of the other of the circuits.

The inner valve 52 corresponds to sub-cut valve, and the outer valve 54 corresponds to a pressure reducing valve.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle brake mechanism comprising:
a master cylinder operated with a brake pedal and having a first hydraulic chamber and a second hydraulic chamber, the master cylinder being capable of generating hydraulic pressures for two circuits;
a stroke simulator that is provided between the brake pedal and the master cylinder and that is elastically deformable by a treading force applied to the brake pedal;
a first fluid channel connecting the first hydraulic chamber of the master cylinder to a first-circuit wheel cylinder;
a second fluid channel connecting the second hydraulic chamber of the master cylinder to a second-circuit wheel cylinder;
a master cut valve that is provided in the first fluid channel and that is capable of hindering communication between the first hydraulic chamber and the first-circuit wheel cylinder;
a slave cylinder connected to the second fluid channel and driven by an actuator to generate a hydraulic pressure;
a third fluid channel provided downstream of the master cut valve and the slave cylinder and connecting the first fluid channel and the second fluid channel to each other; and
a connection control valve provided in the third fluid channel to close the third fluid channel.

2. The vehicle brake mechanism according to claim 1, further comprising:
a sub-cut valve provided in at least one of the first fluid channel and the second fluid channel downstream of the third fluid channel, the sub-cut valve being capable of blocking the hydraulic pressure from the slave cylinder; and
a pressure reducing valve provided to each of the first-circuit wheel cylinder and the second-circuit wheel cylinder, the pressure reducing valve being provided downstream of the sub-cut valve and being capable of releasing the hydraulic pressure from the slave cylinder to a reservoir.

3. The vehicle brake mechanism according to claim 1, further comprising:
a first hydraulic sensor provided in the first fluid channel upstream of the master cut valve;
a second hydraulic sensor provided in the first fluid channel downstream of the master cut valve; and
a third hydraulic sensor provided in the second fluid channel downstream of the slave cylinder.

4. The vehicle brake mechanism according to claim 1, wherein, when a piston connected to the actuator moves forward, the slave cylinder hinders communication between the second hydraulic chamber of the master cylinder and the second-circuit wheel cylinder.

5. A method for controlling the vehicle brake mechanism according to claim 2, comprising:
operating the slave cylinder in a state in which the third fluid channel is opened and the master cut valve hinders the communication between the first hydraulic chamber and the first-circuit wheel cylinder to generate a first hydraulic pressure; and
opening the pressure reducing valve to reduce the hydraulic pressure for the first-circuit wheel cylinder and/or the second-circuit wheel cylinder of at least one of the two circuits to a second hydraulic pressure, the second hydraulic pressure being lower than the first hydraulic pressure.

6. A method for controlling the vehicle brake mechanism according to claim 1, comprising:
transmitting a hydraulic pressure generated in the first hydraulic chamber of the master cylinder to the first-circuit wheel cylinder in a state in which the connection control valve closes the third fluid channel and the master cut valve allows the communication between the first hydraulic chamber and the first-circuit wheel cylinder; and
transmitting the hydraulic pressure generated in the slave cylinder to the second-circuit wheel cylinder in the state.

7. The vehicle brake mechanism according to claim 2, further comprising:
a first hydraulic sensor provided in the first fluid channel upstream of the master cut valve;
a second hydraulic sensor provided in the first fluid channel downstream of the master cut valve; and
a third hydraulic sensor provided in the second fluid channel downstream of the slave cylinder.

8. The vehicle brake mechanism according to claim 2, wherein, when a piston connected to the actuator moves forward, the slave cylinder hinders communication between the second hydraulic chamber of the master cylinder and the second-circuit wheel cylinder.

9. The vehicle brake mechanism according to claim 3, wherein, when a piston connected to the actuator moves forward, the slave cylinder hinders communication between the second hydraulic chamber of the master cylinder and the second-circuit wheel cylinder.

10. The vehicle brake mechanism according to claim 7, wherein, when a piston connected to the actuator moves forward, the slave cylinder hinders communication between the second hydraulic chamber of the master cylinder and the second-circuit wheel cylinder.

* * * * *